United States Patent
Komulainen et al.

(10) Patent No.: US 7,430,101 B2
(45) Date of Patent: Sep. 30, 2008

(54) OVERVOLTAGE PROTECTION OF A FREQUENCY CONVERTER

(75) Inventors: Risto Komulainen, Klaukkala (FI); Trygve Björkgren, Kvevlax (FI)

(73) Assignee: Vacon Oyj, Vaasa (FI)

( * ) Notice: Subject to any disclaimer, the term of this patent is extended or adjusted under 35 U.S.C. 154(b) by 0 days.

(21) Appl. No.: 11/403,866

(22) Filed: Apr. 14, 2006

(65) Prior Publication Data

US 2006/0238940 A1    Oct. 26, 2006

(30) Foreign Application Priority Data

Apr. 22, 2005    (FI) ................................. 20050420

(51) Int. Cl.
*H02H 3/22* (2006.01)

(52) U.S. Cl. .................... 361/111; 361/56; 361/91.1; 361/93.7

(58) Field of Classification Search .................. 361/56, 361/93.7, 100, 111, 118
See application file for complete search history.

(56) References Cited

U.S. PATENT DOCUMENTS

| | | | | |
|---|---|---|---|---|
| 4,319,177 A | * | 3/1982 | Kawada et al. | 318/798 |
| 4,331,994 A | * | 5/1982 | Wirth | 361/56 |
| 5,157,574 A | * | 10/1992 | Tuusa | 361/56 |
| 5,465,202 A | * | 11/1995 | Ibori et al. | 363/37 |
| 5,734,256 A | | 3/1998 | Larsen et al. | |
| 6,600,356 B1 | * | 7/2003 | Weiss | 327/310 |
| 6,657,475 B1 | | 12/2003 | Zahn | |
| 6,657,841 B1 | * | 12/2003 | Melchert et al. | 361/100 |
| 6,795,287 B2 | * | 9/2004 | Kim et al. | 361/109 |
| 6,801,441 B2 | | 10/2004 | Salama | |
| 2002/0159212 A1 | | 10/2002 | Oughton, Jr. | |
| 2004/0246641 A1 | | 12/2004 | Sugimoto et al. | |

FOREIGN PATENT DOCUMENTS

| | | |
|---|---|---|
| DE | 36 14 589 A1 | 11/1987 |
| DE | 102 57 096 A1 | 7/2004 |
| EP | 1 557 923 A1 | 7/2005 |
| FI | 871478 A | 10/1987 |

* cited by examiner

*Primary Examiner*—Michael J Sherry
*Assistant Examiner*—Tien Mai
(74) *Attorney, Agent, or Firm*—Birch, Stewart, Kolasch & Birch, LLP

(57) ABSTRACT

An overvoltage protection system for the intermediate circuit of frequency converter, said frequency converter being a voltage-controlled PWM-frequency converter comprising an uncontrolled mains bridge (10) to be connected to an alternating-current source ($U_{L1}$, $U_{L2}$, $U_{L3}$), a direct-voltage intermediate circuit and a controlled load bridge (12) for producing a multi-phase alternating voltage ($U_U$, $U_V$, $U_W$) of variable frequency, wherein the direct-voltage circuit of the frequency converter contains a low-capacitance direct-voltage capacitor, the mains bridge (10) being connected to the load bridge (12) directly without a high-capacitance direct-voltage capacitor serving as an intermediate energy storage, and which overvoltage protection system contains a varistor (R1). The overvoltage protection system consists of a series connection of the varistor (R1) and a semiconductor switch (V1), said series connection being connected in parallel with the direct-voltage capacitor, which semiconductor switch has a voltage rating lower than the normal operating level of the direct-voltage intermediate circuit.

8 Claims, 2 Drawing Sheets

OVERVOLTAGE PROTECTION OF A FREQUENCY CONVERTER

BACKGROUND OF THE INVENTION

1. Field of the Invention

The present invention relates to an overvoltage protection system for the intermediate circuit of a frequency converter. In particular, the invention concerns an overvoltage protection system for a frequency converter provided with a small intermediate-circuit capacitor and controlled by pulse-width modulation (PWM).

2. Discussion of the Background

A PWM frequency converter provided with a small intermediate circuit capacitor is disclosed e.g. in specification U.S. Pat. No. B2-6,801,441. This specification describes a multi-phase voltage-controlled PWM frequency converter comprising a control unit, an uncontrolled mains bridge to be connected to a multi-phase alternating-current source, a direct-voltage intermediate circuit and a controlled load bridge for feeding a variable-frequency multi-phase alternating voltage to a multi-phase load, in which frequency converter the mains bridge is connected to the load bridge without a high-capacitance direct-voltage capacitor unit serving as an intermediate energy storage. The direct-voltage intermediate circuit of such a PWM-frequency converter is implemented using only a low-capacitance capacitor for limiting the voltage spikes caused in switching situations by the energy stored in leakage inductances.

The intermediate circuit of such a frequency converter must be provided with an overvoltage protection circuit in case of special situations, e.g. a failure of the mains supply.

An overvoltage protection solution for a frequency converter is described in specification DE-A1-102 57 096. This specification describes a frequency converter comprising a rectifier for rectifying a three-phase mains voltage to produce an intermediate-circuit direct voltage and an inverter for inverting the direct voltage of the direct-voltage circuit to produce a variable-frequency three-phase alternating voltage, which is used to feed e.g. an alternating-current motor. This specification proposes an overvoltage protection circuit to be connected in parallel with an intermediate-circuit capacitor having a relatively low capacitance value. The overvoltage protection circuit consists of a high-capacitance electrolytic capacitor and a switching device connected in series with it. The switching device comprises a series connection of a resistor and a diode and, connected in parallel with it, a switch consisting of resistors, a varistor and a thyristor.

In the application described in this DE specification, the electrolytic capacitor only has to withstand the momentary excess current spikes occurring in overvoltage situations, so it is considerably smaller in size and cost than a traditional capacitor connected directly to the intermediate circuit and rated on the basis of a full ripple and a sufficient service life. This solution works without any control circuits. The solution has the drawback of requiring additional components in the circuit, e.g. an electrolytic capacitor, which take up plenty of space and increase the costs of the device.

Another prior-art solution for intermediate-circuit overvoltage protection is to provide the intermediate circuit with a braking chopper in which a power semiconductor switch connects a resistor in parallel with the intermediate-circuit capacitor when its voltage exceeds an operating threshold. A drawback with this solution are the chopper components, which increase the costs of the device and take up plenty of space.

Other prior-art solutions for intermediate-circuit overvoltage protection are various overvoltage protectors, such as a so-called surge arrester, varistor or power Zener diode, connected directly in parallel with the intermediate-circuit capacitor:

A surge arrester-type protection device has the drawback that its voltage remains at a low value as long as a current is flowing, so it requires a series-connected power semiconductor switch to prevent it from receiving energy directly from the supply network (a solution of this type is described in patent application US2004246641).

Selecting the ratings of a varistor-type protection device may be difficult in some cases because it is a low-gradient device, in other words, the voltage difference between the leakage level and the actual clipping level is large.

A Zener-type protection device is of an ideal nature because its operating threshold is very sharp. However, a power Zener is a very expensive component.

SUMMARY OF THE INVENTION

The object of the present invention is to overcome the drawbacks of prior art and to create an overvoltage switching system for the intermediate circuit of a PWM-frequency converter that allows reliable protection to be achieved using components of economical cost.

According to the invention, overvoltage protection is implemented using a series connection of a varistor and a low-voltage power semiconductor switch, wherein the voltage rating of the power semiconductor switch is lower than the normal operating level of the intermediate circuit. In this way, reliable overvoltage protection of the intermediate circuit of a frequency converter provided with a small intermediate-circuit capacitor is achieved, based on well known, small-sized components of economical cost that have proved to be reliable.

The features of the overvoltage protection system of the invention are presented in detail in the claims below.

DESCRIPTION OF THE DRAWINGS

In the following, the invention will be described in detail with reference to an example and the attached drawings, wherein.

DETAILED DESCRIPTION OF THE PREFERRED EMBODIMENTS

Figure 1:
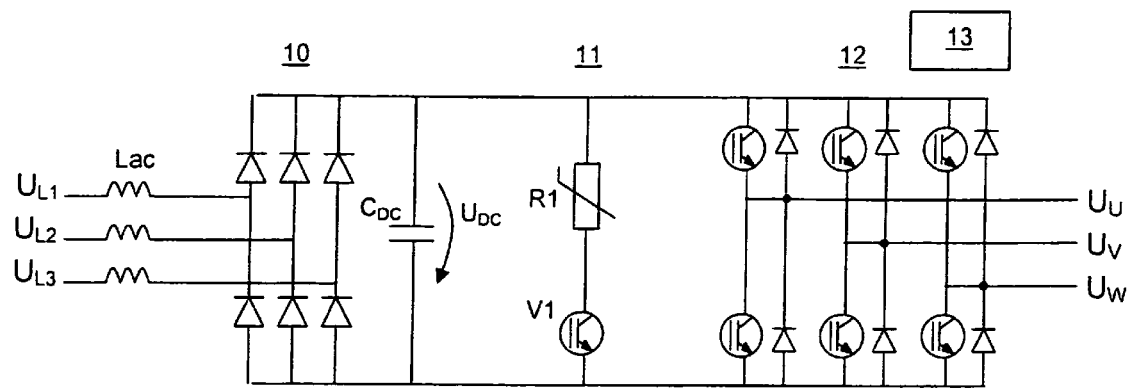
FIG. 1 presents the main circuit of a voltage-controlled PWM-frequency converter, provided with an intermediate-circuit overvoltage protection circuit according to the invention.

FIG. 1 presents a three-phase voltage-controlled PWM-frequency converter comprising a mains bridge (rectifier) 10 for rectifying the three-phase alternating voltage of a supply network, consisting of phase voltages $U_{L1}$, $U_{L2}$, $U_{L3}$, to produce an intermediate-circuit direct voltage $U_{DC}$ and a load bridge (inverter) 12 for inverting the intermediate-circuit direct voltage to produce a three-phase alternating voltage of variable frequency having phase voltages $U_U$, $U_V$, $U_W$ when power is flowing from the network to the load. The frequency converter may feed e.g. a three-phase alternating-current motor. The load bridge 12 is a full-wave bridge with a control unit 13 controlling the phase switches of each phase via pulse-width modulation. 'Phase switch' refers to the switch formed by the semiconductor switches of the upper and lower branches of a phase together, with a diode connected in inverse-parallel with each power semiconductor switch. The mains bridge 10 is an uncontrolled full-wave bridge, with a diode bridge consisting of diodes.

The mains bridge 10 is connected to the load bridge 12 without a high-capacitance direct-voltage capacitor unit functioning as an intermediate energy storage. Thus, the direct-voltage intermediate circuit has only a low-capacitance capacitor $C_{DC}$ for filtering the direct voltage.

As mentioned above, the intermediate circuit of a frequency converter like this must be provided with an overvoltage protection system in case of special situations, e.g. a mains power failure. In the solution of the invention, overvoltage protection is implemented using a series connection 11 of a varistor and a low-voltage power semiconductor switch as presented in FIG. 1.

A varistor (metal oxide varistor, MOV) is an excellent component in respect of its energy absorption properties, which is widely used and economical in cost. By connecting a power semiconductor switch V1 in series with a varistor R1 according to the invention, the clipping property of the overvoltage protection based on will be sufficiently sharp for use in a frequency converter.

In a solution according to this idea, the varistor ratings are so selected that its leakage current with a voltage of $U_{DCN} - U_{V1avalanche}$ (=normal-state operating voltage of the intermediate circuit–breakdown voltage of the power semiconductor switch) is insignificant, e.g. of the order of tens of microamperes. The power dissipation of the power semiconductor switch is thus small and its maximum voltage rating can be considerably lower than the maximum voltage of the intermediate circuit if the power semiconductor switch used is of a type that is capable of withstanding a continuous leakage current at its characteristic breakdown voltage (for example, the nominal voltage of the switch V1 may be 200V when the nominal voltage of the main circuit power semiconductor switches is 1200V). The power semiconductor switch used is preferably e.g. a MOSFET transistor, which is easy to control and typically tolerates a very high maximum pulse current as compared to the nominal current. The component in question also has a so-called avalanche property as is needed in this application, in other words, it can withstand a small current at the breakdown voltage, provided that the continuous power handling capacity is not exceeded. It is also possible to use a high-ohm resistor in parallel with the MOSFET, in which case the latter will not have to work continuously in the avalanche region.

Figure 3:
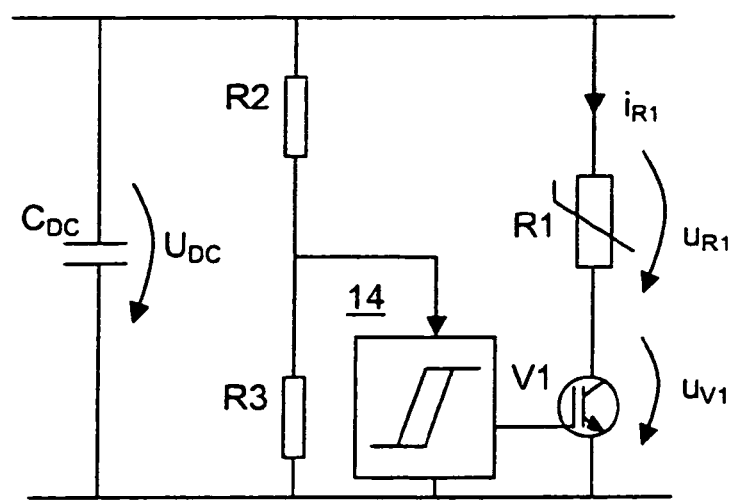
FIG. 3 presents a circuit diagram of the overvoltage protection circuit of the invention.

In this application, the power semiconductor switch is controlled directly from the intermediate-circuit voltage by a control circuit based on e.g. a Zener diode or an amplifier circuit 14 as illustrated in FIG. 3, containing a resistor chain R2, R3 and a comparator function. The control circuit is preferably independent of the rest of the auxiliary voltage and control system of the frequency converter. The control circuit preferably has a hysteresis between the turn-on and turn-off limits. The details of the implementation of the control circuit are not described here as they are obvious to a person skilled in the art.

Figure 2:
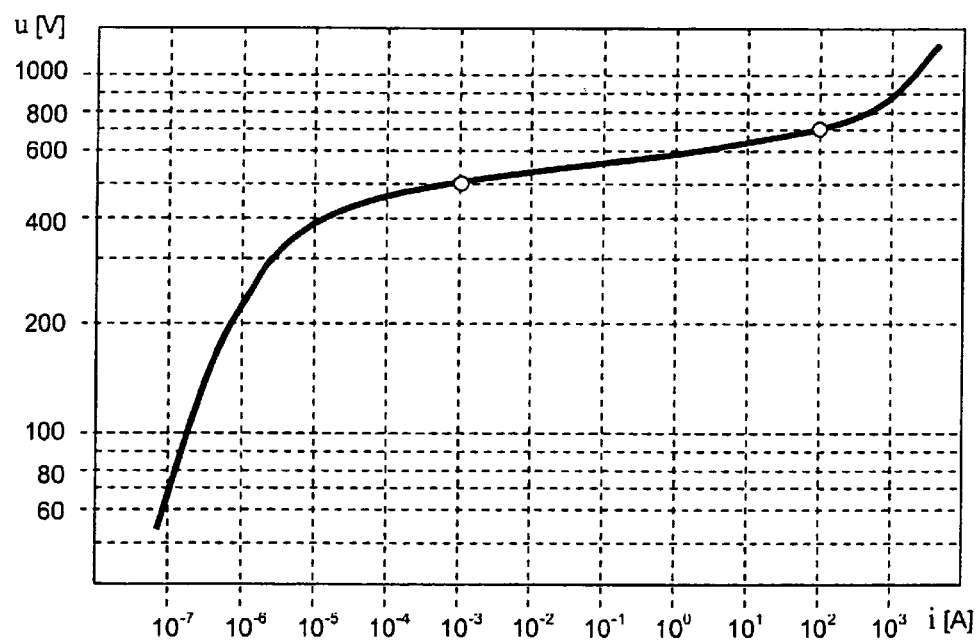
FIG. 2 presents the working characteristic of an actual preferred overvoltage protection component, a varistor.
Figure 4:
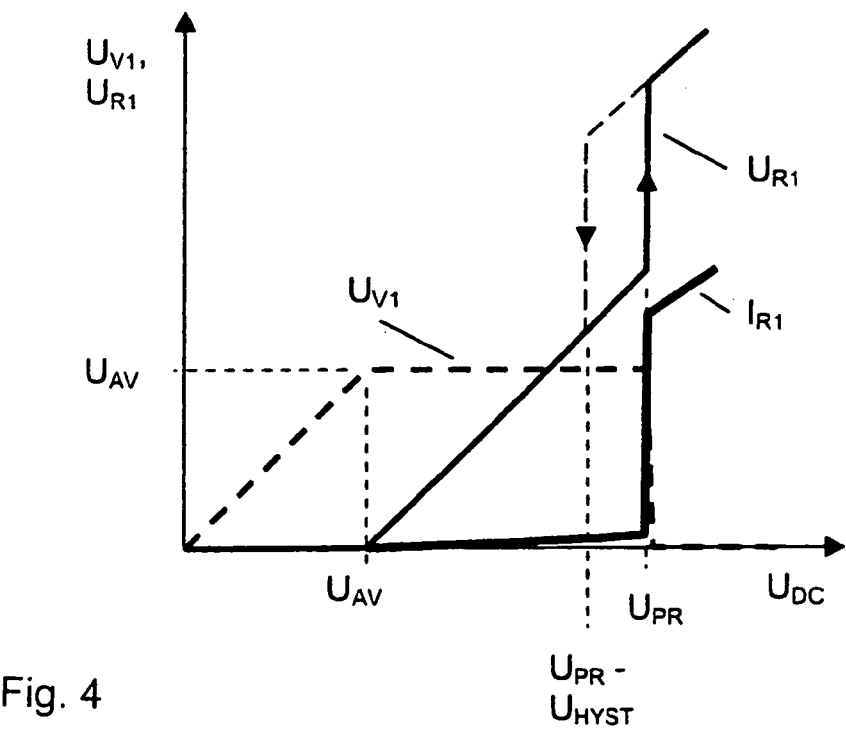
FIG. 4 presents the working characteristics of the overvoltage protection circuit of the invention.

The operating principle of the overvoltage protection circuit of the invention can be learned from the working characteristics presented in FIG. 4, which are described below:

when the intermediate-circuit voltage $U_{DC}$ is lower than the breakdown voltage $U_{AV}$ of the power semiconductor switch V1, the voltage $U_{V1}$ of the power semiconductor switch follows the intermediate-circuit voltage, and the voltage and current of the overvoltage protector R1 are zero when $U_{DC}$ exceeds the breakdown voltage $U_{AV}$, the voltage $U_{V1}$ of the power semiconductor switch is limited to this value and the voltage exceeding it is applied across the varistor ($U_{R1} = U_{DC} - U_{AV}$). The current $i_{R1}$ of the overvoltage protector increases as a function of $U_{R1}$ in accordance with the working characteristic of the varistor when $U_{DC}$ reaches the protection level $U_{PR}$, the power semiconductor switch V1 is turned on, whereupon its voltage $U_{V1}$ falls to almost zero and the voltage $U_{R1}$ seen by the varistor correspondingly jumps to the full intermediate-circuit voltage ($U_{R1} = U_{DC}$). The current $I_{R1}$ of the overvoltage protection circuit, if correctly rated, now increases so much that the intermediate-circuit voltage is prevented from rising above the protection level. For example, if the circuit contains a 200V power semiconductor switch and the protection level is 700V, then the voltage seen by the varistor jumps from a 500V level to a 700V level, so the current of the overvoltage protection circuit correspondingly jumps from a level of about 1 mA to a level of 100 A when a varistor consistent with FIG. 2 is used as the power flowing into the intermediate circuit decreases, the intermediate-circuit voltage $U_{DC}$ falls in accordance with the current-voltage characteristic of the varistor. When the voltage decreases by an amount corresponding to the hysteresis determined by the control circuit (14) ($U_{R1} = U_{DC} = U_{PR} - U_{HYST}$), the control signal to the power semiconductor switch V1 is removed, whereupon its voltage again rises to the breakdown level and the voltage seen by the varistor falls correspondingly, so the current of the overvoltage protection circuit falls to a very low leakage current level.

It is obvious to the person skilled in the art that different embodiments of the invention are not exclusively limited to the example described above, but that they may be varied within the scope of the claims presented below. The power semiconductor switch may be a MOSFET, IGBT, transistor or a similar component that tolerates continuous operation in the avalanche region with a small current.

The invention claimed is:

1. An over-voltage protection system for an intermediate circuit of a frequency converter, said frequency converter including a voltage-controlled pulse-width modulation frequency converter comprising an uncontrolled mains bridge connected to an alternating-current source, a direct-voltage intermediate circuit and a controlled load bridge for producing a multi-phase alternating voltage of variable frequency, the direct-voltage intermediate circuit of the frequency converter including a low-capacitance direct-voltage capacitor as the only capacitor, the mains bridge being connected to the load bridge directly and the overvoltage protection system comprising a series connection of a varistor and a semiconductor switch, said series connection being connected in parallel with the direct-voltage capacitor, the semiconductor switch having a low voltage rating with a low conducting on-state resistance and low power loss; and the semi-conductor switch is configured to operate in an avalanche operation region when the overvoltage protection system is not limiting the intermediate circuit voltage.

2. An overvoltage protection system according to claim 1, wherein the semiconductor switch tolerates continuous operation in an avalanche region with a small current.

3. An overvoltage protection system according to claim 1, wherein a hysteresis exists between turn-on and turn-off limits of the semiconductor switch.

4. An overvoltage protection system according to claim 1, wherein a resistor is connected in parallel with the semiconductor switch to avoid continuous operation in the an avalanche region.

5. An overvoltage protection system according to claim 2, wherein a hysteresis exists between turn-on and turn-off limits of the semiconductor switch.

6. An overvoltage protection system according to claim 2, wherein a resistor is connected in parallel with the semiconductor switch to avoid continuous operation in an avalanche region.

7. An overvoltage protection system according to claim 3, wherein a resistor is connected in parallel with the semiconductor switch to avoid continuous operation in an avalanche region.

8. An overvoltage protection system according to claim 2, wherein the semi-conductor switch is a MOSFET or IGBT transistor.

* * * * *